United States Patent
Mantell et al.

(10) Patent No.: US 10,493,696 B2
(45) Date of Patent: Dec. 3, 2019

(54) SYSTEM AND METHOD FOR ALIGNMENT OF A MULTI-NOZZLE EXTRUDER IN THREE-DIMENSIONAL OBJECT PRINTERS

(71) Applicant: Xerox Corporation, Norwalk, CT (US)

(72) Inventors: David A. Mantell, Rochester, NY (US); Christopher G. Lynn, Wolcott, NY (US); Mark A. Cellura, Webster, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 201 days.

(21) Appl. No.: 15/661,810

(22) Filed: Jul. 27, 2017

(65) Prior Publication Data

US 2019/0030805 A1    Jan. 31, 2019

(51) Int. Cl.
| | |
|---|---|
| *B29C 64/232* | (2017.01) |
| *B29C 64/118* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B29C 64/227* | (2017.01) |
| *B29C 64/205* | (2017.01) |

(52) U.S. Cl.
CPC .......... *B29C 64/232* (2017.08); *B29C 64/118* (2017.08); *B29C 64/227* (2017.08); *B29C 64/393* (2017.08); *B33Y 10/00* (2014.12); *B33Y 30/00* (2014.12); *B33Y 50/02* (2014.12); *B29C 64/205* (2017.08)

(58) Field of Classification Search
CPC ... B29C 64/232; B29C 64/227; B29C 64/393; B29C 64/118; B29C 64/205; B33Y 50/02; B33Y 30/00; B33Y 10/00
See application file for complete search history.

(56) References Cited

U.S. PATENT DOCUMENTS

| | | | |
|---|---|---|---|
| 6,626,511 | B2 | 9/2003 | Riou |
| 7,837,298 | B2 | 11/2010 | Van De Wynckel et al. |
| 8,322,821 | B2 | 12/2012 | Tsai et al. |
| 8,562,101 | B2 | 10/2013 | Calamita et al. |
| 8,727,473 | B2 | 5/2014 | Calamita |
| 8,931,877 | B1 | 1/2015 | Rodriguez et al. |
| 9,067,445 | B2 | 6/2015 | Donaldson |

(Continued)

FOREIGN PATENT DOCUMENTS

WO    2016/085965 A1    6/2016

*Primary Examiner* — Xiao S Zhao
*Assistant Examiner* — Michael Robinson
(74) *Attorney, Agent, or Firm* — Maginot Moore & Beck LLP

(57) ABSTRACT

A method for identifying an angular deviation in the orientation of a multi-nozzle extruder includes moving the multi-nozzle extruder in a first process direction to form a first extrusion material swath and moving the multi-nozzle extruder in a second process direction opposing the first process direction to form a second extrusion material swath. The method further includes identifying widths and heights of the swaths from scanned image data and identifying a component of angular deviation for the multi-nozzle extruder with reference to at least one of a difference between the first swath width and the second swath width and another difference between the first swath height and the second swath height.

8 Claims, 6 Drawing Sheets

(56) References Cited

U.S. PATENT DOCUMENTS

| | | | |
|---|---|---|---|
| 9,168,685 B2 | 10/2015 | Swanson et al. | |
| 9,233,507 B2 | 1/2016 | Bibas | |
| 2002/0089556 A1* | 7/2002 | Riou | B41J 25/304 |
| | | | 347/8 |
| 2012/0229621 A1* | 9/2012 | Turner | G01B 9/02021 |
| | | | 348/135 |
| 2013/0155140 A1* | 6/2013 | Calamita | B41J 25/003 |
| | | | 347/19 |
| 2014/0242208 A1 | 8/2014 | Elsworthy | |
| 2015/0210011 A1* | 7/2015 | Conrow | B29C 64/386 |
| | | | 264/40.4 |
| 2015/0367375 A1 | 12/2015 | Page | |
| 2016/0325498 A1 | 11/2016 | Gelbart | |
| 2017/0129052 A1* | 5/2017 | Buller | B33Y 10/00 |

\* cited by examiner

SYSTEM AND METHOD FOR ALIGNMENT OF A MULTI-NOZZLE EXTRUDER IN THREE-DIMENSIONAL OBJECT PRINTERS

CROSS REFERENCE

This application cross-references copending U.S. application Ser. No. 15/661,711, which was filed on Jul. 27, 2017 and is entitled "System And Method For Roll Alignment Of A Multi-Nozzle Extruder In Three-Dimensional Object Printers," the entire contents of which are incorporated herein by reference.

TECHNICAL FIELD

This disclosure is directed to extruders used in three-dimensional object printers and, more particularly, to alignment of extruders that include multiple nozzles.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extrusion printing in which an extruder emits a melted build material, such as heated and softened ABS plastic, in a predetermined pattern. The printer typically operates the extruder to form successive layers of the build material that form a three-dimensional printed object with a variety of shapes and structures. While many printers employ an extruder that includes a single nozzle to emit the melted material, some extruders include multiple nozzles.

One challenge that confronts the operation of three-dimensional object printers includes the proper alignment of the extruders with an underlying surface that receives the melted material to form the three-dimensional printed objects. In many printers, the extruder emits a first layer of the melted build material onto a flat receiving member and forms each successive layer of build material over an external layer of the partially completed three-dimensional object. During operation, if the extruder deviates from a parallel orientation with the underlying receiving member, the face of the extruder may distort the shape of the melted material, which may reduce the quality of three-dimensional printed objects. Multi-nozzle extruders that include larger extruder faces with arrays of nozzles are especially susceptible to angular deviations from parallel with the underlying receiving member. The distortions of the build material compound over multiple layers of a three-dimensional object and may reduce the quality of three-dimensional printed objects that the three-dimensional object printer forms using the improperly aligned extruder. Consequently, improvements to three-dimensional object printers that enable measurement and correction of angular deviations in multi-nozzle extruders would be beneficial.

SUMMARY

In one embodiment, a method for operating a three-dimensional object printer to identify an angular deviation of a multi-nozzle extruder has been developed. The method includes moving, with an actuator, a multi-nozzle extruder in a first process direction along a first axis within a print zone of the three-dimensional object printer, operating a first nozzle in a plurality of nozzles in the multi-nozzle extruder to emit an extrusion material onto a surface of a receiving member in the print zone to form a first swath during the moving of the multi-nozzle extruder in the first process direction, moving, with the actuator, the multi-nozzle extruder in a second process direction along the first axis within the print zone of the three-dimensional object printer, the second process direction being different than the first process direction, operating the first nozzle in the plurality of nozzles to emit the extrusion material onto the surface of the receiving member in the print zone to form a second swath during the moving of the multi-nozzle extruder in the second process direction, generating, with an optical sensor, scanned image data of the first swath and the second swath, identifying, with a controller, at least one of a first width and a first height of the first swath in the scanned image data, identifying, with the controller, at least one of a second width and a second height of the second swath in the scanned image data, and identifying, with the controller, a first angular deviation component for the multi-nozzle extruder with reference to at least one of a first difference between the first width and the second width and a second difference between the first height and the second height.

In another embodiment, a three-dimensional object printer that is configured to identify an angular deviation of a multi-nozzle extruder has been developed. The three-dimensional object printer includes a multi-nozzle extruder positioned in a print zone, an actuator configured to move the multi-nozzle extruder in the print zone, an optical sensor configured to generate scanned image data of the print zone, and a controller operatively connected to the multi-nozzle extruder, the actuator, and the optical sensor. The controller is configured to move the multi-nozzle extruder in a first process direction along a first axis within the print zone using the actuator, operate a first nozzle in a plurality of nozzles in the multi-nozzle extruder to emit an extrusion material onto a surface of a receiving member in the print zone to form a first swath during the movement of the multi-nozzle extruder in the first process direction, move the multi-nozzle extruder in a second process direction along the first axis within the print zone of the three-dimensional object printer using the actuator, the second process direction being different than the first process direction, operate the first nozzle in the plurality of nozzles to emit the extrusion material onto the surface of the receiving member in the print zone to form a second swath during the movement of the multi-nozzle extruder in the second process direction, generate scanned image data of the first swath and the second swath using the optical scanner, identify at least one of a first width and a first height of the first swath in the scanned image data, identify at least one of a second width and a second height of the second swath in the scanned image data, and identify a first angular deviation component for the multi-nozzle extruder with reference to at least one of a first difference between the first width and the second width and a second difference between the first height and the second height.

BRIEF DESCRIPTION OF THE DRAWINGS

The foregoing aspects and other features of three-dimensional object printers with multi-nozzle extruders are explained in the following description, taken in connection with the accompanying drawings.

DETAILED DESCRIPTION

Figure 1:
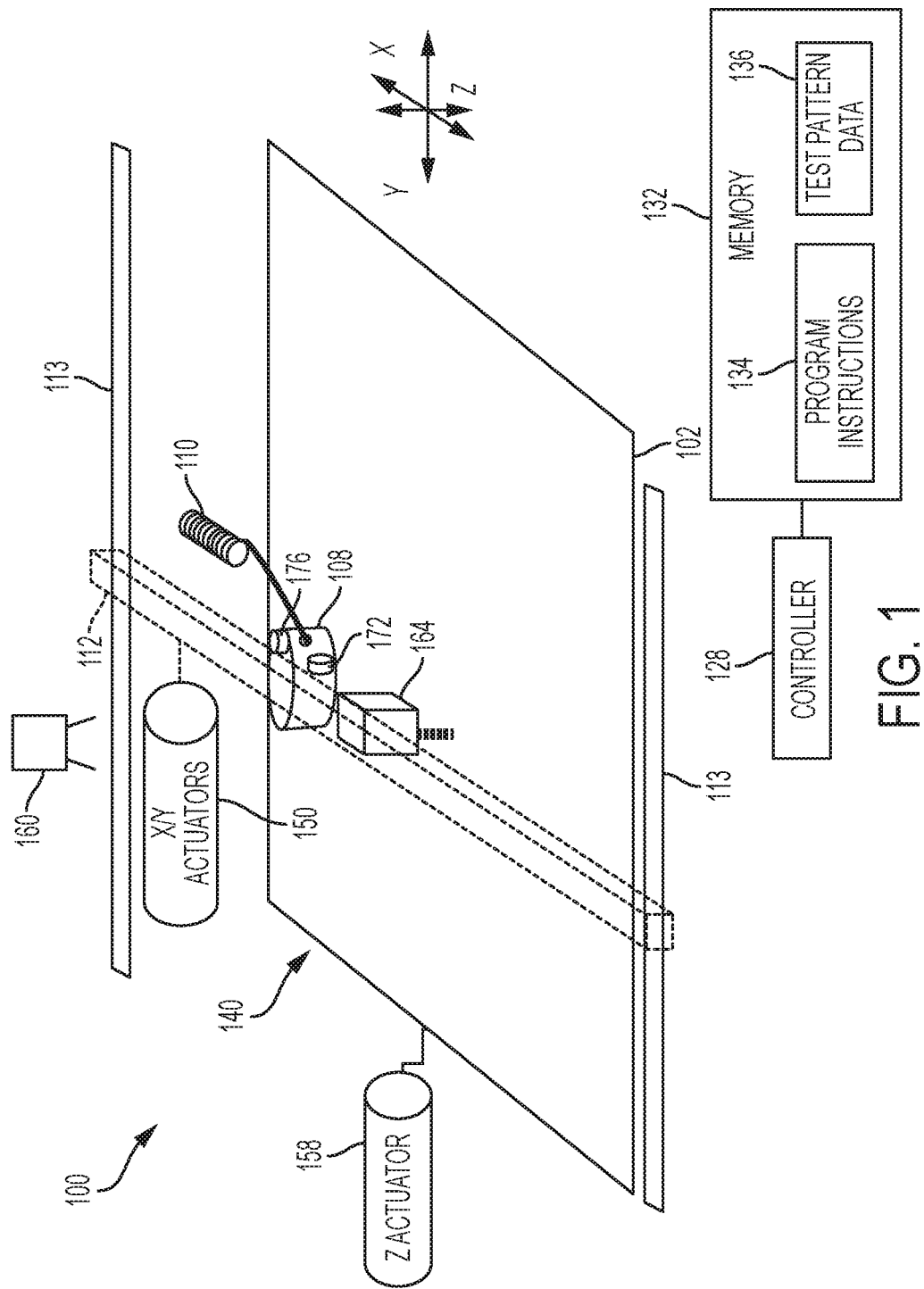
FIG. 1 is a schematic diagram of a three-dimensional object printer.

For a general understanding of the environment for the device disclosed herein as well as the details for the device, reference is made to the drawings. In the drawings, like reference numerals designate like elements.

As used herein, the term "extrusion material" refers to a material that one or more nozzles in an extruder emit to form layers of material that either form an object or provide structural support for the object during operation of a three-dimensional object printer. As described in further detail below, the printer is further configured to form predetermined arrangements of the extrusion material using different nozzles in a multi-nozzle extruder to form predetermined test patterns to enable the printer to identify angular deviations in the orientation of the extruder. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, other thermoplastics, and any other form of material that is suitable for emission through the nozzles of an extruder in a liquid or semi-liquid form and then for solidification to form a durable three-dimensional printed object. Examples of support materials include, but are not limited to, high-impact polystyrene (HIPS), polyvinyl alcohol (PVA), and other extrudable materials.

As used herein, the terms "extruder" or "extruder" are used interchangeably and refer to a component of a printer that melts extrusion material and provides the melted extrusion material to multiple nozzles share a common faceplate in an on-demand manner to form elongated swaths of the extrusion material during a three-dimensional printing operation. When activated, each nozzle in the extruder extrudes the extrusion material in a continuous manner and the extrusion head moves in a process direction to enable activated nozzles to form elongated swaths of the extrusion material. As described in more detail below, a valve assembly in the extruder enables the simultaneous operation of multiple nozzles to extrude the extrusion material at different times during the printing operation. Multi-nozzle extruders incorporate two or more nozzles that extrude the extrusion material simultaneously or at different times during a three-dimensional object printing process.

As used herein, the term "nozzle" refers to an orifice in an extruder that extrudes a liquid or semi-liquid extrusion material during a three-dimensional printing operation to form extruded patterns of the extrusion material corresponding to a path of relative movement between the extruder and the receiving surface. The nozzle orifice is formed flush with an external face of the extruder. During operation, the nozzle extrudes a substantially continuous linear arrangement of the melted material along the process path of the extruder. The extruder controls a rate at which the nozzle extrudes the extrusion material. The extruder includes valves to activate and deactivate the emission of extrusion material from individual nozzles. The diameter of the orifice in the nozzle affects the width of the extruded line of extrusion material. Different extruder embodiments include nozzles having a range of orifice sizes with wider orifices producing wider arrangements of the extrusion material while narrower orifices producing narrower arrangements of the extrusion material. As described in more detail below, some multi-nozzle extruder embodiments include a plate or other planar member that includes a linear one-dimensional or a two-dimensional arrangement of nozzles.

Multi-nozzle extruders that include a one or two-dimensional array of nozzles are affected by the angular deviation between the face of the extruder that includes the outlets of the nozzles and a receiving member. The face of the extruder includes a planar region that provides a housing for a two-dimensional arrangement of nozzle openings for individual extrusion nozzles in the extruder. In one embodiment, the receiving member is another planar surface, such as a metal plate or other suitable member, which receives the arrangements of extruded material from the nozzles in the extruder. In a fully aligned configuration, the extruder is arranged in a predetermined orientation relative to the surface of the receiving member, but during operation the extruder sometimes experiences an angular deviation from the predetermined orientation. In some embodiments, the predetermined orientation places the two-dimensional arrangement of nozzles in the extruder in a parallel orientation with the two-dimensional surface of the receiving member. For example, if the receiving member is a substantially flat planar surface, then nozzles in the face of the extruder in a properly aligned configuration are aligned in a plane that is parallel with another plane defined by the surface of the receiving member. As used herein, the term "parallel" is used consistently the plain and ordinary meaning of this term as used in the art to describe two planar surfaces that are separated by a uniform distance from each other within a three-dimensional space. However, in practical embodiments the face of the extruder and the receiving member are also considered to have a parallel alignment if an angular deviation from a strictly parallel orientation is within a predetermined tolerance range for operation in a three-dimensional object printer.

As used herein the term "angular deviation" or more simply "deviation" refers to an angular misalignment of the face of the extruder from the parallel orientation with the receiving member. As used herein, the term "angular deviation component" or more simply "component" refers to a portion of the total angular deviation that is measured along a single axis. Each angular deviation component identifies a portion of the total angular deviation from parallel for the face of the extruder about one axis in the three-dimensional space. As described in further detail below, a three-dimensional object printer operates an extruder to form test patterns of the extrusion material to identify individual components of the angular deviation. The measurement of the angular deviation component about a single axis is useful to identifying and correcting a misalignment of the extruder about the single axis, even if the extruder may experience angular deviations along different axes. Furthermore, measuring two or more components of the angular deviation about different axes enables identification of the angular deviation from parallel between the extruder and the receiving member surface in a three-dimensional space.

As used herein, the term "pressure chamber" refers to a cavity formed within a face of an extruder that holds a supply of liquefied extrusion material and supplies the liquefied extrusion material to one or more nozzles in the extruder during a three-dimensional object printing operation. The pressure chamber is further configured to maintain a predetermined level of pressure on the liquid extrusion material to control a rate at which one or more nozzles extrude the extrusion material onto a receiving surface. In some embodiments, an external feed system for the extrusion material that is connected at an inlet of the pressure chamber supplies liquefied extrusion material under pressure to maintain the predetermined pressure level within the pressure chamber during operation of the extruder. As described in more detail below, because some extruders include multiple nozzles that are activated and deactivated on an individual basis using valves, the pressure chamber supplies liquefied extrusion material so that any activated nozzles extrude the extrusion material at a substantially constant rate even as the number of activated nozzles changes during a printing operation.

As used herein, the term "arrangement of extrusion material" refers to any pattern of the extrusion material that the extruder forms on a receiving surface during a three-dimensional object printing operation. Common arrangements of extrusion material include straight-line linear arrangements of the extrusion material and curved arrangements of the extrusion material. The three-dimensional object printer forms various structures using combinations of different arrangements of the extrusion material. Additionally, in some configurations a digital controller in the three-dimensional object printer operates the extruder and the individual nozzles in the extruder to form a predetermined test pattern that includes specific arrangements of the extruded materials with a predetermined structure. A three-dimensional object printer performs automated image analysis of the printed test pattern to identify the angular deviation of the extruder relative to a receiving member about at least one axis to reduce or eliminate variations in the heights and widths of extrusion material swaths that the extruder forms during operation of the three-dimensional object printer.

As used herein, the term "swath" refers to a straight-line or curved arrangement of extrusion material that one or more nozzles extrude onto a region of a receiving surface within the boundaries of extrusion material that forms an outline around the region. As described in more detail below, an extruder uses one or more extrusion nozzles to form swaths of extrusion material to form one or more layers of extrusion material during a three-dimensional object printing operation.

As used herein, the term "process direction" refers to a direction of relative movement between an extruder and a receiving surface that receives extrusion material from one or more nozzles in the extruder. The receiving surface is either a receiving member that holds a three-dimensional printed object or a surface of the partially formed three-dimensional object during an additive manufacturing process. In the illustrative embodiments described herein, one or more actuators move the extruder in the print zone, but alternative printer embodiments move the receiving member to produce the relative motion in the process direction while the extruder remains stationary.

As used herein, the term "cross-process direction" refers to an axis that is perpendicular to the process direction. The process direction and cross-process direction refer to the relative path of movement between the extruder and the surface that receives the extrusion material. In some configurations, the extruder includes an array of nozzles that extend along the cross-process direction with a predetermined distance in the cross-process direction between adjacent nozzles in the extruder.

FIG. 1 depicts a three-dimensional object printer ("printer") 100 that is configured to operate an extruder to form three-dimensional printed objects. The printer 100 includes a receiving member 102, a multi-nozzle extruder 108, extruder support arm 112, controller 128, memory 132, X/Y actuators 150, a Z actuator 158, extruder angular adjustment actuators 172 and 176, a camera 160, and an optional displacement sensor 164. In the printer 100, the X/Y actuators 150 move the extruder 108 to different locations in a two-dimensional plane (the "X-Y plane") along the X and Y axes to extrude patterns of the extrusion material that forms one layer in a three-dimensional printed object. For example, in FIG. 1 the X/Y actuators 150 translate the support arm 112 and extruder 108 along guide rails 113 to move along the Y axis while the X/Y actuators 150 translate the extruder 108 along the length of the support arm 112 to move the extruder along the X axis. The actuators 150 move the extruder 108 in different process directions within a print zone 140 located over a surface of the receiving member 102 to enable the extruder 108 to form patterns of extruded material on the surface of the receiving member 102.

The support arm 112 includes a receiving member and one or more actuators that move the extruder 108 during printing operations. In the printer 100, one or more actuators 150 move the support arm 112 and extruder 108 along the X and Y axes during the printing operation. For example, one of the actuators 150 move the support arm 112 and the extruder 108 along the Y axis while another actuator moves the extruder 108 along the length of the support arm 112 to move along the X axis. In the printer 100, the X/Y actuators 150 optionally move the extruder 108 along both the X and Y axes simultaneously along either straight or curved paths. The controller 128 controls the movements of the extruder 108 in linear paths that enable the nozzles in the extruder 108 to extrude patterns of the extrusion material onto the receiving member 102. To form a predetermined test pattern of the extrusion material, the controller 128 moves the extruder 108 in a rasterized process direction motion along the perpendicular X and Y axes.

In the printer 100, the Z actuator 158 controls the distance between the extruder 108 and the receiving member 102 along the Z axis to ensure that the nozzles in the extruder 108 remain at a suitable height to extrude extrusion material onto an object during the printing process. In the printer 100, the X/Y actuators 150, and the Z actuator 158 are embodied as electromechanical actuators, such as electric motors, stepper motors, or any other suitable electromechanical device.

The receiving member 102 is a planar member, such as a glass plate, polymer plate, or foam surface, which receives patterns of the extrusion material including test patterns or layers of a three-dimensional printed object during operation of the printer 100. The extruder 108 includes an extruder face 308 that is formed from a planar portion of the extruder 108 that surrounds a plurality of nozzles. The extruder face 308 is, for example, a stainless steel or other metallic portion of the extruder that forms a structure to surround the orifices of the nozzles. When activated, each nozzle extrudes extrusion material onto the surface of the receiving member 102 or a surface of a partially formed object. The individual nozzles in the extruder 108 are each coupled with valves that can activate and deactivate the flow of the extrusion material through the nozzles in the extruder 108 on an individual basis. In the example of FIG. 1, the extrusion material supply 110 includes a spool of ABS plastic or another suitable extrusion material filament that unwraps from the spool to supply extrusion material to the extruder 108. In the illustrative embodiment of FIG. 1, the single extrusion material supply 110 provides extrusion material to a single pressure chamber within the extruder 108 that supplies melted extrusion material to each of the nozzles in the extruder 108. In alternative embodiments, the extrusion material supply 110 provides multiple filaments of extrusion material to different nozzles in a multi-nozzle extruder.

In the printer 100, the camera 160 generates one or more digital photographs of the surface of the receiving member 102 in the print zone 140 including test patterns of extrusion material that are formed on the surface of the receiving member 102. Each digital photograph includes a two-dimensional array of scanned image data in the form of digital pixels that capture the structure of different swaths in the test pattern on the surface of the receiving member 102. The camera 160 is one embodiment of an optical sensor that generates digital scanned image data of test patterns formed from the extrusion material on the surface of the receiving member 102. However, in alternative embodiments a linear optical sensor array or an individual sensor in the print zone 140 or a separate flatbed scanner that scans over the receiving member 102 generates the scanned image data as a series of one-dimensional scanlines of scanned image data.

In the printer 100, the displacement sensor 164 is, for example, a laser range finder, optical range finder, or other device that measures a distance along the Z axis between the predetermined location of the displacement sensor 164 and the surface of the receiving member 102 and any patterns of extrusion material that are formed on the receiving member 102. In the embodiment of FIG. 1, the displacement sensor 164 is a single "point" displacement sensor that generates height measurement data corresponding to a small portion of the receiving member 102 or a swath of extrusion material that is formed on the receiving member 102. The optical sensor 164 is mounted on the support arm to enable the X/Y actuators 150 to move the displacement sensor 164 over the surface of the receiving member 102 with rasterized motion that is similar to the motion of the extruder 108 to enable the displacement sensor 164 to generate height profile data for any structure that is formed on the surface of the receiving member 102. In another embodiment, the displacement sensor 164 is configured as a linear sensor with multiple sensing elements that measure the heights of multiple locations along a linear portion of print zone 140. As described in more detail below, in some embodiments the displacement sensor 164 generates measurement data that enables the controller 128 to identify the height of different patterns of extrusion material along the Z axis.

In the printer 100, the camera 160 and the displacement sensor 164 are both embodiments of an optical sensor that generate scanned image data of swaths of the extrusion material that are formed on the surface of the receiving member 102. In some embodiments the camera 160 and the displacement sensor 164 are both components in an optical sensor that generates two-dimensional scanned image data and height profile data for swaths of extrusion material that are formed on the surface of the receiving member 102.

The extruder 108 includes a plurality of nozzles that are fluidly coupled to an internal pressure chamber (not shown) within the face of the extruder 108. Individual values, such as needle valves, fluidly couple the nozzles to the pressure chamber. During operation, the valves open and close to control the extrusion of material through each of the nozzles individually. In the printer 100, the extruder 108 extrudes material onto the surface of the receiving member 102 in predetermined patterns while the X/Y actuators 150 move the extruder 108 in different process directions along the X and Y axes in the print zone 140.

Figure 3:
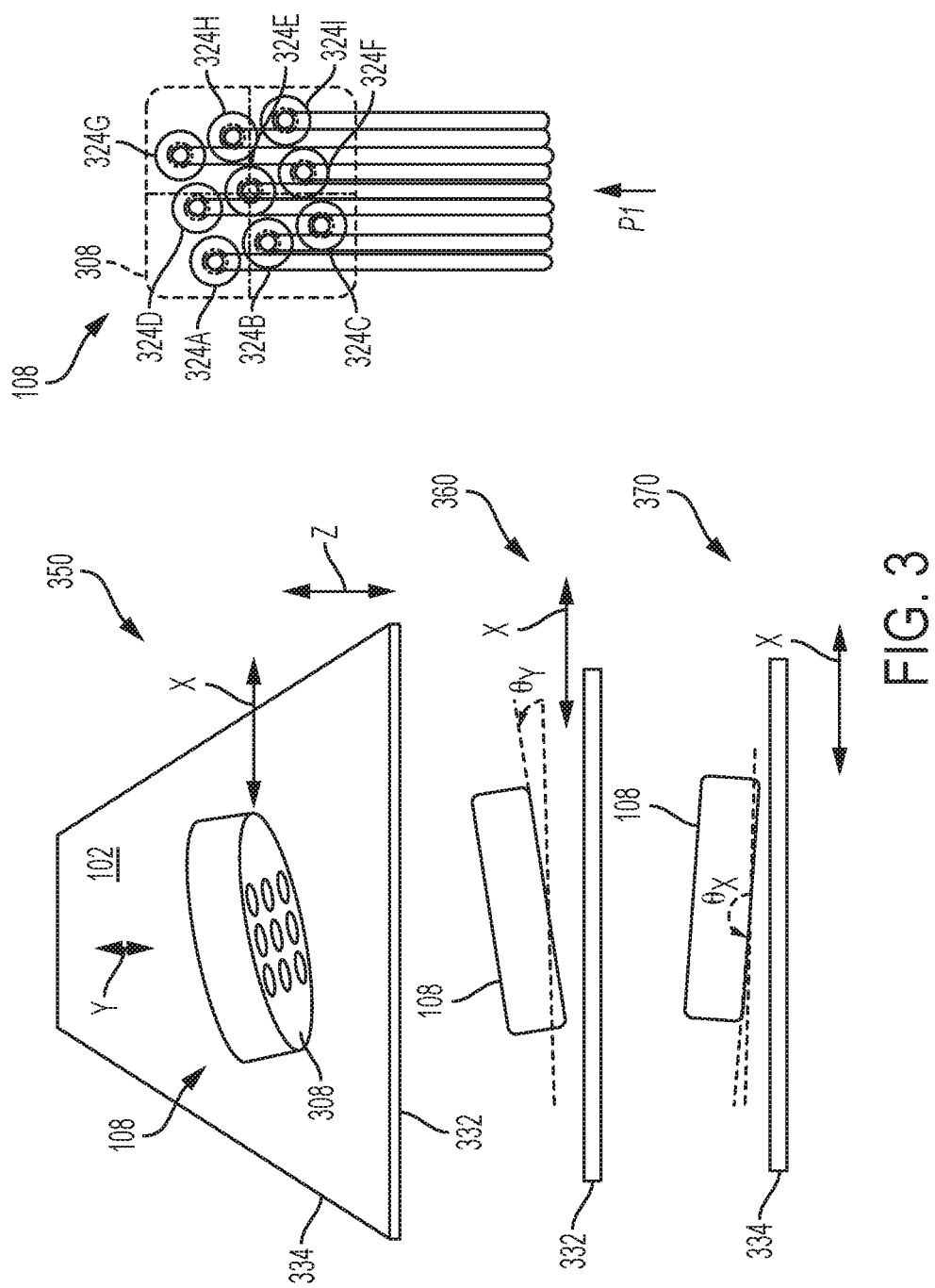
FIG. 3 is a schematic view of nozzles in an illustrative embodiment of a multi-nozzle extruder and an example of an angular deviation of the multi-nozzle extruder.

FIG. 3 depicts the multi-nozzle extruder 108 of FIG. 1 in more detail. In the illustrative embodiment of FIG. 3, the extruder 108 includes a total of nine (9) nozzles 324A-324I in a predetermined geometric arrangement, which is a 3×3 staggered two-dimensional array in the illustrative embodiment of FIG. 3. The nozzles 324A-324I in the extruder 108 are arranged with a uniform pattern of separations in the face of the extruder 108. The extruder 108 includes a plurality of valves where each valve is connected to one of the nozzles 324A-324I and to the pressure chamber in the extruder 108. During operation, the valves open and close to enable all of the nozzles or any subset of the nozzles to extrude the extrusion material onto the surface of the receiving member 102.

Figure 5:
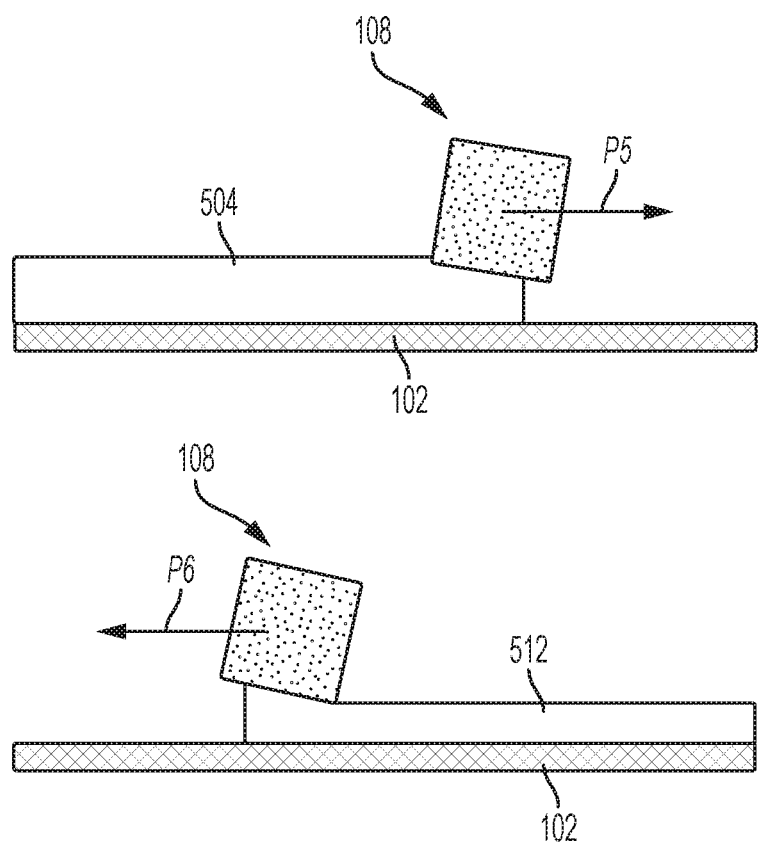
FIG. 5 is a diagram depicting the effects of extruder angular deviation in a three-dimensional object printer.

The face 308 of the extruder 108 contains the nozzles 324A-324I. As described above, in some instances the extruder 108 experiences the angular deviation from a predetermined orientation with the surface of a receiving member, such as the receiving member 102 in the printer 100. In the event of an angular deviation, at least one edge of the face 308 touches the extrusion material that has been emitted from one or more of the nozzles 324A-324I if the edge of the face is in a trailing edge state as depicted in the example of FIG. 5 as the extruder 508 travels in the process direction P6.

In some printer configurations, the extruder 108 experiences an angular deviation misalignment across multiple axes of motion. As illustrated in view 350 in FIG. 3, the extruder 108 experiences angular deviation that affects the alignment of the face of the extruder 308, including the extrusion nozzles, with the receiving surface 102 along both the X and the Y axes. In one embodiment, the axes X and Y represent axes of relative movement between the extruder 108 and the receiving surface 102 during operation of the printer. In the illustrative example of the printer 100, the extruder 108 moves in two different process directions along the X axis. The two different process directions are "opposing" directions, which is to say that the extruder 108 moves in both directions along the X axis with a 180° angle between the two process directions. More generally, moving the extruder in an opposing process direction need not require moving the extruder at precisely a 180° angle in the opposing direction along the axis, but instead merely in a second direction that enables an extruder exhibiting angular deviation along a given axis of motion to distort the swaths of extruded material when moving in one of two opposing directions along an axis. Similarly, the extruder 108 also moves in two opposing process directions along the Y axis. The angular deviation for the extruder 108 along the X axis may be different than the angular deviation for the extruder 108 along the Y axis.

As described above, the angular deviation from a parallel orientation between the face 308 in the extruder 108 and the surface of the receiving member 102 can have multiple angular deviation components along two or more axes. FIG. 3 depicts the X and Y axes of movement for the extruder 108 as examples of two angular deviation components. View 360 depicts a simplified view of the extruder 108 as viewed along the X axis along edge 332 of the receiving member 102. As the extruder 108 moves along the X axis the angular deviation component $\theta_y$, which corresponds to the perpendicular Y axis, produces the angular tilt seen in the view 360. Similarly, in the view 370 depicts a simplified view of the extruder 108 as viewed along the Y axis along edge 334 of the receiving member 102. As the extruder 108 moves along the Y axis the angular deviation component $\theta_x$, which corresponds to the perpendicular X axis, produces the angular tilt seen in the view 370. After identifying the two angular deviation components $\theta_y$ and $\theta_x$ using the methods described herein, the controller 128 optionally identifies the full angular deviation of the extruder 308 from the parallel orientation with the surface of the receiving member 102 in a three-dimensional space, although in some embodiments the controller 128 only identifies an individual component of the angular deviation. While FIG. 3 depicts two angular deviation components that provide the minimal information necessary to identify the full angular deviation of the extruder 108, in other embodiments the angular deviation of the extruder is identified using three or more components corresponding to multiple axes.

In FIG. 3, the extruder 108 moves in the print zone 140 along two different process direction axes X and Y, although in other embodiments the extruder 108 moves along only one axis or more than two axes during an additive manufacturing process in the printer 100. The nozzles in the extruder 108 are aligned to enable all of the extrusions to form parallel adjacent swaths of the extrusion material with little or no gaps between the adjacent swaths. FIG. 3 depicts the extruder 108 moving in a first process direction P1 corresponds in the print zone 140 to form a pattern of extruded swaths. While FIG. 3 depicts one geometric arrangement of the nozzles in the multi-nozzle extruder 108, alternative multi-nozzle extruder configurations include different numbers of two or more nozzles and geometric arrangements of the nozzles.

FIG. 5 depicts the effects of an angular deviation for the extruder 108 as the extruder moves in two opposing process directions P5 and P6 along a single axis. In FIG. 5, the face of the extruder 108 exhibits an angular deviation with the face of the extruder being angled forward as the extruder 108 moves in a process direction P5. Along the process direction P5 the shape of the extrusion material 504 the height of the extruding nozzles at different positions in the extruder affects the heights and widths of the swaths of extrusion material. In particular, nozzles that are located at a greater distance from the receiving surface along the Z axis produce swaths that have a greater height and narrower width, while nozzles that are located at a closer distance to the receiving surface emit swaths of the extrusion material with a broader width and lower height.

As depicted in FIG. 5, when the extruder 508 moves in the opposite process direction P6, the leading edge of the extruder experiences an angular deviation backwards and the trailing edge of the face of the extruder controls the height and width of the extrusion material 512. The differences of the extrusion material shape compound over multiple layers of a three-dimensional object and may reduce the quality of three-dimensional printed objects that the three-dimensional object printer forms using the improperly aligned extruder 108. When the extruder 108 experiences an angular deviation component about an axis that is perpendicular to the process directions P5 and P6, the shape of the extrusion material varies with direction and with the placement of nozzles within the face of the extruder. The angular deviation from a parallel orientation of the extruder face that is depicted in FIG. 5 affects the height and width of the swaths of extrusion material as the extruder moves in different process directions. For example, as depicted in FIG. 5, when the extruder 108 moves in the process direction P5 with a "forward" angular deviation with a leading edge of the face of the extruder 108 being angled downward in front of the nozzles, the extruded pattern 504 does not engage the trailing edge of the face of the extruder. However, when the same extruder 108 with the same angular deviation moves in the opposing process direction P6 at a 180° angle to the process direction P5, the extruder 108 has a "backward" angular deviation in which the trailing edge of the face engages swaths of the extrusion material and determines the shape of the extruded material.

Referring again to FIG. 1, the angular adjustment actuators 172 and 176 are electromechanical actuators such as stepper motors or other suitable devices that adjust the alignment of the extruder 108 relative to the surface of the receiving member 102. As described above, each angular deviation component corresponds to an axis that is perpendicular to a give process direction axis for movement of the extruder. The controller 128 operates the angular adjustment actuators 172 and 176 to reduce or eliminate angular deviations from the predetermined orientation between the nozzles in the face of the extruder 108 and the surface of the receiving member 102 in the print zone 140. In the illustrative embodiment of FIG. 1, the angular adjustment actuator 172 adjusts the rotation of the extruder 108 about the Y axis, which corresponds to the angular deviation of the extruder 108 as the extruder moves along the X axis. Similarly, the angular adjustment actuator 176 adjusts the rotation of the extruder 108 about the X axis, which corresponds to the angular deviation of the extruder 108 as the extruder moves along the Y axis. Alternative embodiments use a different configuration of actuators to reduce or eliminate one or more components of the angular deviation for the extruder.

In the printer 100, the controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the receiving member 102 and the support arm 112. The controller 128 is operatively connected to the extruder 108 to control operation of the plurality nozzles in the extruder 108 and to the angular adjustment actuators 172 and 176 to adjust the rotational angle of the extruder 108 relative to the surface of the receiving member 102. The controller 128 is operatively connected to the camera 160 to control the operation of the camera 160 to generate scanned image data of arrangements of the extrusion material in predetermined test patterns that the extruder 108 forms on the surface of the receiving member 102. The controller 128 is operatively connected to the displacement sensor 164 to enable the controller 128 to monitor a height of patterns of the extruded material on the surface of the receiving member 102.

The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and test pattern image data 136. The controller 128 executes the stored program instructions 134 to operate the components in the printer 100 to form predetermined test patterns using the nozzles in the multi-nozzle extruder 108. The controller 128 also executes the stored program instructions 134 to identify angular deviations between the extruder 108 and the surface of the receiving member 102 along one or more axes of motion for the extruder 108 in the print zone 140, and optionally to operate actuators that are operatively connected to the extruder 108 to reduce or eliminate the angular deviation. The test pattern image data 136 includes, for example, a predetermined set of patterns for swaths that the nozzles in the extruder 108 form on the surface of the receiving member 102 to enable the controller 128 to identify angular deviation of the extruder 108 along at least one axis of motion based on scanned image data of the swaths. The controller 128 operates the actuators to move the extruder 108 and activates and deactivates different nozzles in the extruder 108 to form arrangements of the extrusion material in different portions of a predetermined test pattern.

Figure 2:
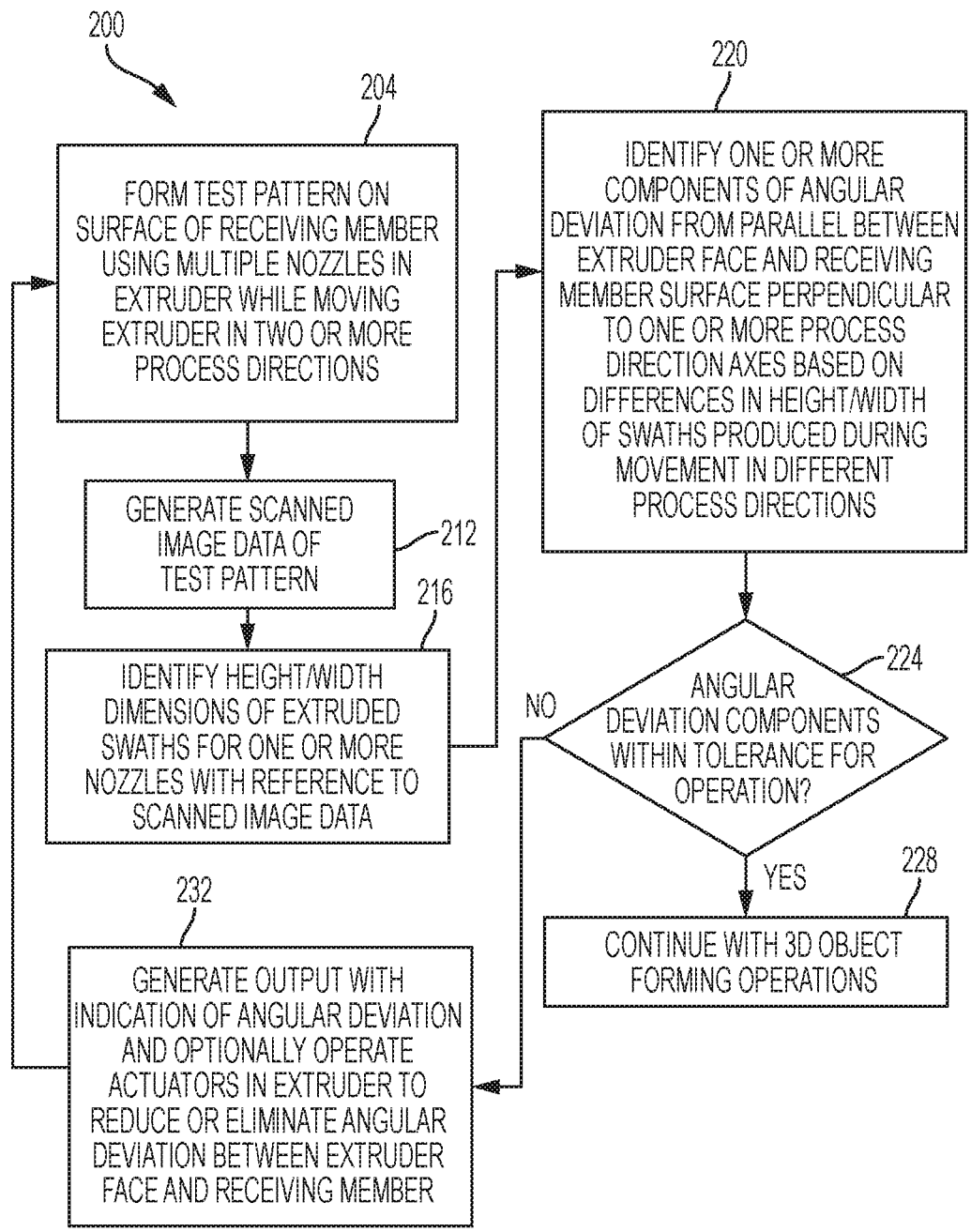
FIG. 2 is a block diagram of a process for identifying an angular deviation of an extruder from a predetermined orientation with a receiving member in a three-dimensional object printer.

FIG. 2 depicts a process 200 for operation of a three-dimensional object printer to identify an angular deviation from the predetermined orientation between a multi-nozzle extruder and a receiving member in a print zone of the three-dimensional object printer. The process 200 is described in conjunction with the three-dimensional object printer 100 of FIG. 1 for illustrative purposes.

Process 200 begins as the printer 100 moves the extruder in one or more predetermined process directions and operates the nozzles in the multi-nozzle extruder to form a test pattern on the surface of the receiving member (block 204). In the printer 100, the controller 128 operates the X/Y actuators to move the extruder 108 in at least one process direction while activating and deactivating the individual nozzles in the extruder 108 to form a test pattern from the extrusion material on the surface of the receiving member 102. The controller 128 uses the test pattern image data 136 to control the movement of the extruder 108 and the operation of the individual nozzles in the extruder 108 to form the predetermined test pattern from the extrusion material.

Figure 4:
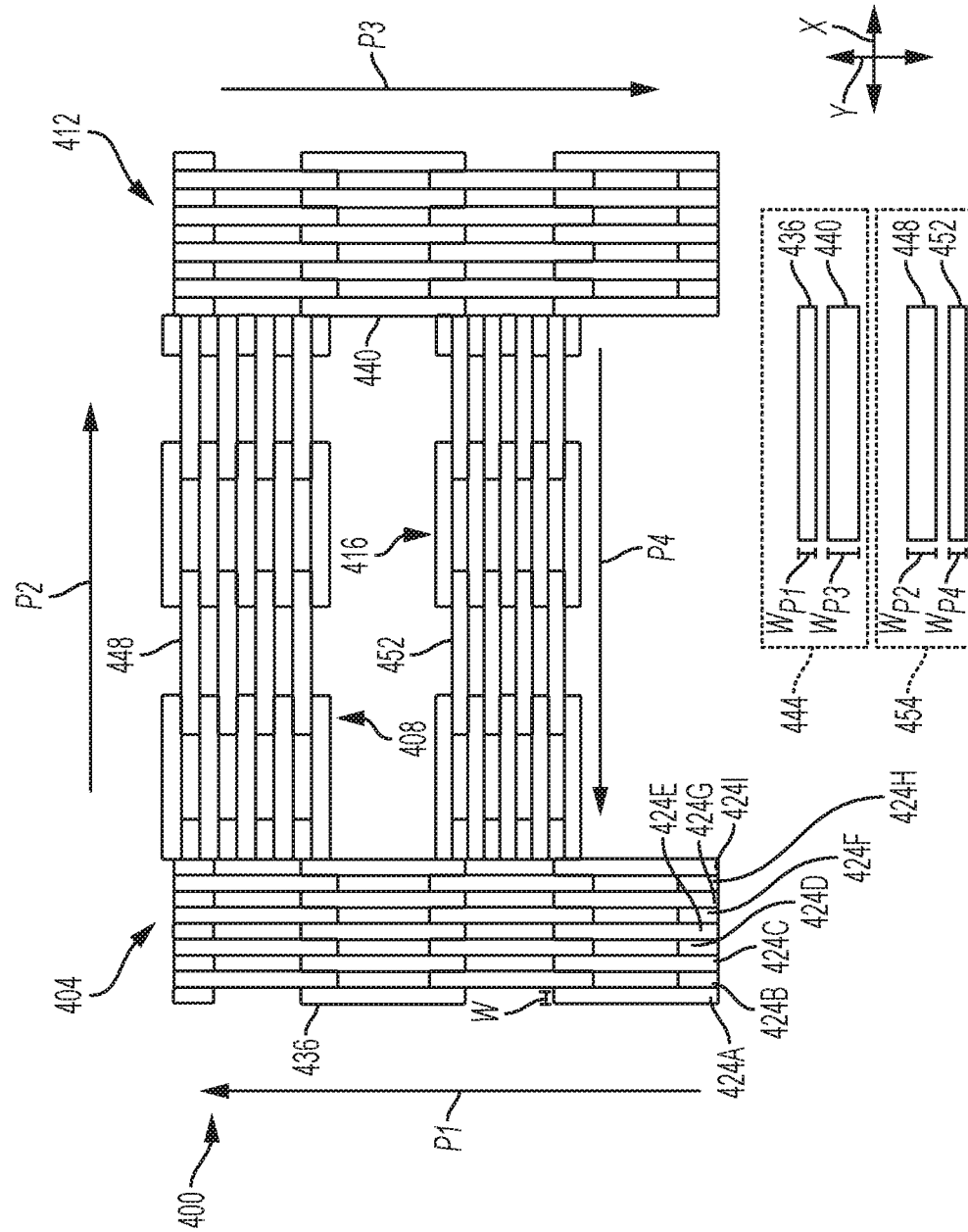
FIG. 4 is a schematic view of a predetermined test pattern that the multi-nozzle extruder of FIG. 3 produces during operation of the three-dimensional object printer of FIG. 1.

FIG. 4 depicts an illustrative embodiment of a test pattern 400 in more detail. The test pattern 400 includes swaths of the extrusion material that are formed by each nozzle in the extruder 108 in four different portions, 404, 408, 412, and 416. Each portion of the test pattern 400 includes a repeating pattern of swaths that are formed using alternating sets of nozzles in the extruder 108 so that a portion of each swath is separated from a neighboring swath by a gap on the surface of the receiving member 102. The separation between swaths enables identification of the individual swaths that are produced by different nozzles in the extruder 108 in scanned image data of the test pattern 400. For example, in the portion of the test pattern 404 the swaths at locations 424A-424I are formed by the nozzles 324A-324I, respectively, in the extruder 108 with alternating sets of the swaths that are formed by a first set of nozzles 324A, 324C, 324E, 324G, and 324I or by a second set of nozzles 324B, 324D, 324F, and 324H. During operation, the controller 128 operates the extruder 108 to activate and deactivate the first and second sets of nozzles in the extruder 128 to form the alternating sets of swaths in the test pattern 400 while the extruder 108 moves in each of the process directions P1 to P4.

In the test pattern 400, the process directions P1 and P3 are opposing process directions along the Y axis and the process directions P2 and P4 are opposing process directions along the X axis. In the embodiment of FIG. 4, the X and Y axes are orthogonal to each other (i.e. arranged at 90° angles). In other embodiments, the printer 100 generates test patterns that include swaths arranged on other process direction axes that are separated by different angles, such as 45°, 30°, 15°, etc. angles between process direction axes to identify extruder angular deviation along multiple axes.

To form the test pattern 400, the extruder 108 moves in four different process directions along two different perpendicular axes (X and Y) to form the swaths in each portion of the test pattern. The extruder 108 moves in process directions P1 and P3 in opposing directions along the Y axis while the first and second sets of nozzles are activated and deactivated to form the portions 404 and 412, respectively. The extruder 108 moves in process directions P2 and P4 in opposing directions along the X axis while the first and second sets of nozzles are activated and deactivated to form the portions 408 and 416, respectively. In the test pattern 400, the extruder forms two swaths of the extrusion material for each nozzle in the extruder 108 in each portion of the test pattern 400 to enable analysis of multiple swaths for each nozzle in the extruder. However, in alternative embodiments each nozzle emits one swath of the extrusion material in a test pattern or emits multiple swaths of the extrusion material in different test pattern configurations.

During operation of the extruder 108, the activated nozzles in the extruder 108 each emit the extrusion material at approximately equal volumetric rates. When the extruder 108 is properly aligned in a parallel with the surface of the receiving member 102, the heights and widths of the extrusion material in each swath are generally uniform while the presence of extruder angular deviation along one or more axes produces variations in the width of the extruded material in each swath without regard to the direction of movement of the extruder relative to the underlying receiving surface. However, if the extruder experiences a deviation from the predetermined parallel orientation with the receiving surface, a face of the extruder engages the swaths of extruded material to distort one or both of the width and the height of the extruded material swaths. As used herein, the term "width" as applied to a swath of extrusion material refers to the dimension of the extrusion material in the swath in a direction that is perpendicular to the process direction of the extruder that forms the swath across the surface of the receiving member. For example, in FIG. 4 the swath 424A has a width W in the dimension that is perpendicular to the process direction P1. As used herein, the term "height" as applied to a swath of extrusion material refers to the dimension of the extrusion material in the swath extending along a perpendicular axis from the surface of the receiving member. For example, in FIG. 1 the height of a swath of the extrusion material refers to the dimension of the extrusion material swath that extends upwards from the surface of the receiving member 102 along the Z axis.

FIG. 4 depicts the printed test pattern 400 that is formed when the extruder 108 experiences two different angular deviation components about both the X and Y axes. In the illustrative example of FIG. 4, the extruder 108 tilts "forward" as the extruder 108 moves along the Y axis process direction P1 and the same angular deviation produces a "backward" tilt as the extruder 108 moves along the opposing process direction P3. The component of the angular deviation that is depicted in FIG. 4 is about the X axis that is perpendicular to the Y axis of movement of the extruder 108. The backward angular deviation along the process direction P3 places a portion of the face 308 in the extruder 108 in contact with the extruded swaths, which deforms the shape of the extruded material in the swaths in the test pattern portion 412. Thus, the angular deviation in the extruder affects the widths and heights of swaths of the extruded material in the test pattern differently based on the process direction of the extruder between the test pattern portions 404 and 412. During the process 200, the printer 100 identifies the differences in width and height between swaths that are formed as the extruder 108 moves in opposing directions along one or more axes to identify and correct angular deviation in the extruder 108.

More particularly, the swaths in the portion 404 of the test pattern 400 have different widths and heights than the corresponding swaths in the portion 412 of the test pattern 400 as the extruder 108 moves along opposing directions of the Y axis. The angular deviation of the extruder 108 places a portion of the face 308 in contact with the extruded material along the process direction P3 in portion 412 of the test pattern 400, which distorts the shape of the swaths. The swaths in the portion 412 have a wider width and reduced height relative to the swaths in the portion 404. In FIG. 4, the view 444 depicts the corresponding swaths 436 and 440 from the portions 404 and 412, respectively. A single nozzle in the extruder 108 forms both swaths, but as depicted in the view 444, the width $W_{P1}$ of the swath 436 is narrower than the width $W_{P3}$ of the swath 440 due to the distortion that the extruder face 308 produces along the process direction P3. While not illustrated expressly in FIG. 4, the height of the swath 436 is also larger than the height of the swath 440 due to the distortion produced by the extruder angular deviation.

In FIG. 4, the extruder 108 also experiences angular deviation about the Y axis that affects the widths and heights of swaths that extend along the X axis. The swaths in the portion 408 of the test pattern 400 have different widths and heights than the corresponding swaths in the portion 416 of the test pattern 400 as the extruder 108 moves along opposing directions of the X axis. The angular deviation of the extruder 108 places a portion of the face 308 in contact with the extruded material along the process direction P2, which distorts the shape of the swaths. The swaths in the portion 408 have a wider width and reduced height relative to the swaths in the portion 416. In FIG. 4, the view 454 depicts the corresponding swaths 448 and 452 from the portions 408 and 416, respectively. A single nozzle in the extruder 108 forms both swaths, but as depicted in the view 454, the width $W_{P2}$ of the swath 448 is wider than the width $W_{P4}$ of the swath 452 since a trailing edge of the extruder face 308 engages the swaths of extrusion material along the process direction P2. While not illustrated expressly in FIG. 4, the height of the swath 452 is also larger than the height of the swath 448 due to the distortion produced by the extruder angular deviation.

Referring again to FIG. 2, the process 200 continues as the printer 100 generates scanned image data of the test pattern using an optical sensor (block 212). In the illustrative embodiment of FIG. 1, the camera 160 generates one or more digital images of the region of the surface of the receiving member 102 that includes the test pattern formed from the extrusion material, such as the test pattern 400 of FIG. 4 or another suitable test pattern. In another embodiment, the depth sensor 164 generates scanned image data corresponding to a height profile generated at multiple locations in the print zone 140. For example, in one embodiment the controller 128 operates the X/Y actuators 150 to move the depth sensor 164 in a rasterized path over the receiving member 102 to generate a two-dimensional height profile of the swaths that form the test pattern on the surface of the receiving member 102.

The process 200 continues as the controller 128 identifies the widths, heights, or both widths and heights of swaths of the extruded material in the test pattern for two or more nozzles in the extruder (block 216). In the printer 100, the controller 128 identifies the widths of different swaths using image processing techniques that are known to the art including, for example, edge-finding algorithms, automated image rotation, thresholding, profile fitting, and the like. Additionally, in some embodiments the camera 160 generates full-color image data of the swaths in the test pattern on the surface of the receiving member 102 and the controller 128 identifies the widths of different swaths based on a color contrast between the extruded material and the surface of the receiving member 102 to identify the edges and widths of different swaths in the test pattern. The controller 128 also identifies the individual nozzles that produce each swath based on the overall structure of the predetermined test pattern.

For example, in the test pattern 400 the controller 128 identifies a first width for a swath 424A, a second width for the swath 424C, a third width for the swath 424E, etc. and the controller 128 identifies the widths of at least one swath for each nozzle in the extruder in some embodiments of the process 200. The gaps between the swaths enable the controller 128 to identify the edges and widths of individual swaths in the scanned image data without inadvertently combining two swaths. As described above, in the test pattern 400 the printer 100 forms multiple swaths using each nozzle while moving the extruder 108 in different process directions (P1-P4). In some embodiments the controller 128 identifies an average swath width for a nozzle using an averaged value for all of the swaths that the individual nozzle produces in each portion of the test pattern to reduce the effects of random variations in the width of the extrusion material in an individual swath.

In another embodiment, the three-dimensional object printer 100 identifies the heights of the swaths in the test pattern either instead of identifying the width of the swaths or in addition to measuring the widths of the swaths. The controller 128 operates the X/Y actuators 150 to pass the displacement sensor 164 over the printed swaths of material in the test pattern in a direction that is perpendicular to each swath. The displacement sensor 164 generates a plurality of height measurements for a height profile of each swath including both of the lateral edges of the swath and a peak located at or near the center of the swath. The lateral edges of the swath refer to the edges that extend along the length of the swath, and the distance between the two lateral edges of each swath in a direction that is perpendicular to the length of the swath corresponds to the width of the swath. At the edges of the swath, the swath has a height that matches or is very similar to the height of the underlying receiving member 102. The height increases towards the center of the swath, which enables the controller 128 to identify the locations of two lateral edges of a swath and to generate a corresponding measurement of the width of the swath. The controller 128 uses at least one set of height profile measurement data, and in some embodiments an average of multiple sets of height profile measurement data, to identify the location of the lateral edges of each swath. The controller 128 identifies the width of each swath based on the distance that separates the locations of the lateral edges of each swath, where the distance is identified along an axis that is perpendicular to the length of the swath. In some embodiments the controller 128 identifies an average swath height for a nozzle using an averaged value for all of the swaths that the individual nozzle produces in the test pattern to reduce the effects of random variations in the height of the extrusion material in an individual swath.

In another embodiment of the process 200, the controller 128 uses the displacement sensor 164 to measure the height of each swath in the test pattern, such as identifying a first height of the swath 424A, a second height for the swath 424C, a third height for the swath 424E, etc. In some embodiments, the controller 128 receives multiple displacement values from the displacement sensor 164 at different locations on each swath. The controller 128 identifies at least one location with a local-minimum distance to the displacement sensor, which corresponds to a location on the swath with a local-maximum height, as the height of each swath of extrusion material. In some embodiments, the controller 128 identifies the height of each swath as an averaged value from two or more height measurements that are generated at different locations on the swath to reduce the effects of random variations in the structure of the extrusion material in the measurement of the height of each swath.

In another embodiment, the controller1 128 identifies the relative heights of different swaths in the test pattern based on the optical levels of the swaths in the scanned image data of the test pattern. In the embodiment of the printer 100, the surface of the receiving member 102 is formed from a member with a color that has a high level of optical contrast with the extruded material. In the printer 100, if the extruder 108 forms a swath of the extrusion material that is not distorted by the extruder face 308 due to angular deviation in the extruder, then the extrusion material in the swath has a predetermined shape, including a height, based on the volumetric output of each nozzle in the extruder 108. The extrusion material in the undistorted swath has a higher optical opacity than other swaths that are distorted due to contact with the face 308 in the extruder 108 that occurs when the extruder 108 experiences angular deviation and distorts the extrusion material. In a distorted swath, the extrusion material has a reduced height. Consequently, the extrusion material in the distorted swath has a lower optical opacity, and a correspondingly higher reflectance level, relative to a non-distorted swath of the same extrusion material from the same nozzle.

In the printer 100, the camera 160 generates scanned image data of the swaths in the test pattern 400 as well as the underlying surface of the receiving member 102. Each pixel in the scanned image data includes a reflectance value that corresponds to a level of reflected light received from a particular location in the print zone 140 including both the surface of the receiving member 102 and the material in the swaths of the test pattern 400. The controller 128 optionally identifies the heights of different swaths of material in the test pattern 400 based on a reflectance level of at least one pixel, and in some embodiments the averaged reflectance level of multiple pixels, of image data from the camera 160 corresponding to each swath and a predetermined reflectance data curve that is stored with the program instruction data 134 in the memory 132. The memory 132 stores reflectance curve data that corresponds to the optical properties of different types of extrusion material that are used in the printer 100. For example, a black extrusion material has a much lower level of reflectivity than a white extrusion material. The individual curves for different types of extrusion materials having different heights are determined empirically and stored in the memory 132 of the printer 100. In some embodiments a single material is used for alignment of the extruder and the curve for that one material is calibrated and stored for use to determine the different heights.

Figure 6:
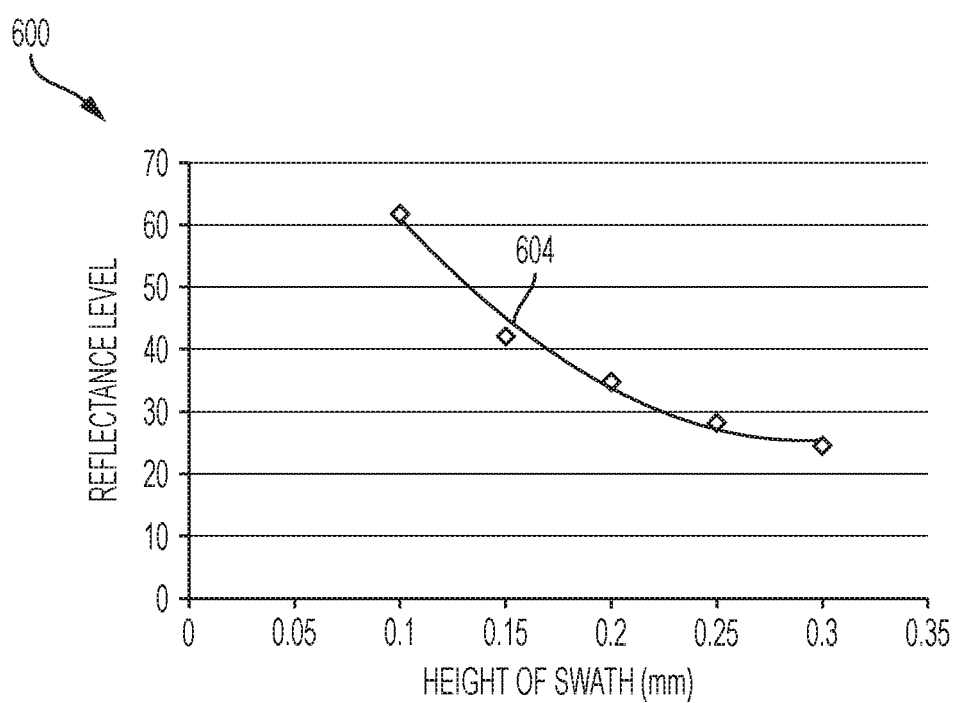
FIG. 6 is a diagram of a curve that maps reflectance levels of pixels in scanned image data of swaths of the extrusion material to the heights of different swaths of the extrusion material.

FIG. 6 depicts a graph 600 with a curve 604 that depicts a mapping of a plurality of reflectance levels to a plurality of heights of swaths of the extrusion material in scanned image data that the printer 100 generates using the camera 160. In the graph 600, the reflectance levels are in a predetermined numeric range, such as 0 to 255 for 8-bit reflectance values although other embodiments employ different numeric ranges for reflectance values. The reflectance levels in FIG. 6 depict an averaged reflectance level for the swath based upon the individual reflectance levels of multiple pixels of scanned image data of each swath in the test pattern. A low reflectance value indicates that a smaller portion of light that is incident to the swath is reflected and received by the camera 160 while a high reflectance value indicates that a greater portion of the light that is incident to the swath is reflected and received by the camera 160. In FIG. 6, the curve 604 depicts an inverse relationship between the heights of different swaths and the reflectance levels of the swaths, with swaths of larger heights having lower reflectance levels while swaths with lower heights have greater reflectance values. In some embodiments, the memory 132 stores the curve 604 or an equivalent data structure such as a lookup table to enable the controller 128 to identify the heights of different swaths of material in a test pattern based on the reflectance levels of scanned image data pixels for the swaths and the predetermined mapping of reflectance levels to swath heights stored in the memory 132. Thus, the controller 128 uses the reflected levels of light in the pixels of scanned image data for each swath and the curve 604 to generate an indirect measurement of the heights of different swaths in the test pattern 400.

In some embodiments, the controller 128 identifies both the width and the height of the swaths of the extrusion materials using the techniques that are described above. During the process 200, the extruder 108 emits swath of the extrusion material in the test pattern using substantially equal volumes of the extrusion material in each swath. As described above, the variations in height and the width of the extrusion material are therefore both related to the distance between each nozzle in the extruder 108 and the surface of the receiving member 102.

The process 200 continues as the controller 128 identifies one or more angular deviation components of the extruder from a parallel orientation relative to the receiving surface based on the relative differences in width, height, or both width and height of the extruded swaths that the extruder forms during at least two different passes that occur in opposing process directions within the print zone 140 (block 220). The controller 128 identifies an angular deviation component for the extruder about an axis that is perpendicular to the axis of movement of the extruder to produce each set of swaths in the test pattern. Using the test pattern of FIG. 4 as an example, the controller 128 identifies a first angular deviation component about the X axis based on the widths and/or heights of the swaths 404 and 412, which extend along the perpendicular Y axis. The controller identifies a second angular deviation component about the Y axis based on the widths and/or heights of the swaths 408 and 416, which extend along the perpendicular X axis. As described below, the identification of the angular deviation component includes identification of the direction of the angular deviation for the extruder about a given axis if the extruder exhibits an angular deviation that is outside of the operational range for the extruder.

Using the test pattern portions 408 and 416 that are arranged along the X axis in FIG. 4 as examples, the controller 128 identifies an averaged width, height, or combination of width and height for the extruded swaths that are formed by all of the nozzles in the extruder 108 for each of the two portions 404 and 416. In another embodiment the controller 128 identifies averaged width and height values for at least one nozzle instead of using all of the nozzles in the extruder. During the process 200, the controller 128 identifies the direction of the angular deviation component about an axis that is perpendicular to the process direction (e.g. the angular deviation about the Y axis for the test pattern swaths 408 and 416 that are formed along the X axis) based on the two predetermined process directions and the identification of the widths, heights, or heights and widths of the swaths in each of the directions.

Using FIG. 4 as an example, the controller 128 identifies that the angular deviation component of the extruder 108 about the Y axis places the face of the extruder at a reduced height along the Z axis on the left side of the X axis and at a corresponding increased height on the right side of the X axis. The controller identifies this direction of the angular deviation component because the trailing edge of the extruder face engages the extrusion material to produce swaths in the portion of the test pattern 408 that have wider widths and lower heights compared to the corresponding swaths in the portion of the test pattern 416. As the extruder 108 moves in the opposing process direction P4, the trailing edge of the extruder 108 is located at an elevated height in the Z axis and the face of the extruder 108 does not affect the widths and heights of the swaths in the second portion 416. Thus, the controller 128 identifies the direction of the angular deviation about a single axis based on the identified relative heights of two sides of the face of the extruder 108 along the perpendicular axis of motion for the extruder that forms the swaths in the test pattern portions 408 and 416. The controller 128 performs a similar process to identify the angular deviation component about the X axis based on the relative widths and heights of the swaths in the test pattern portions 404 and 412.

FIG. 4 depicts a scenario in which the extruder 108 exhibits an angular deviation component about the X and Y axes that negatively affects the operation of the printer 100. However if the extruder 108 has proper angular deviation alignment along either axis, then the swath widths and heights between the two portions of the test pattern that are formed along a given axis exhibit minimal deviations and the controller 128 identifies that the extruder 108 is properly aligned along the axis.

Referring again to FIG. 2, if the controller 128 identifies that the angular deviation components of the extruder 108 are within a predetermined operational range for a predetermined orientation with the surface of the receiving member 102 (block 224), then the printer 100 continues with formation of three-dimensional objects using the properly aligned multi-nozzle extruder 108 (block 228). When the extruder 108 is within the operational range, the nozzles in the extruder 108 form swaths of the extrusion material with substantially equal widths and heights, within a predetermined expected variance range, in either of the opposing process directions along a given axis.

If, however, angular deviation of the extruder 108 is outside of the predetermined operational range (block 224), then the controller 128 optionally uses the angular adjustment actuator 172 to adjust a rotational angle of the extruder 108 to reduce or eliminate a first angular deviation that is identified about the X axis and the actuator 176 to reduce or eliminate a second angular deviation that is identified about the Y axis for the extruder 108 (block 232). The process 200 optionally iterates with a return to the processing described above with reference to block 204 to form an additional test pattern using the realigned extruder 108. The process 200 iterates until the angular deviation of the extruder 108 is within the predetermined operational range for a parallel orientation between the face of the extruder 108 and the surface of the receiving member 102.

In embodiments of three-dimensional object printers that do not include the angular adjustment actuators 172 and 176, the controller 128 generates an output using, for example, a visual display device or network device to indicate the identified angle of deviation for the extruder 108. In this embodiment, the process 200 provides an automated output to indicate the required manual adjustment for the extruder 108. While the embodiment of the process 200 described above identifies and corrects extruder angular deviation along two substantially orthogonal axes, such as the X and Y axes in the print zone 140, in other embodiments the printer 100 produces test patterns along only one axis or more than two axes to identify and mitigate extruder angular deviations about at least one axis. Additionally, during subsequent operation of the extruder, the printer optionally moves the extruder in process directions other than the process directions that are used to identify and correct angular deviations of the extruder. For example, in one configuration the printer 100 moves the extruder 108 in a linear process direction other than the X or Y axes or in a curved process direction to form selected patterns of the extrusion material even if the extruder 108 does not travel in a curved path during the process 200.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional object printer comprising:
a multi-nozzle extruder positioned in a print zone;
an actuator configured to move the multi-nozzle extruder in the print zone;
an optical sensor configured to generate scanned image data of the print zone; and
a controller operatively connected to the multi-nozzle extruder, the actuator, and the optical sensor, the controller being configured to:
move the multi-nozzle extruder in a first process direction along a first axis within the print zone using the actuator;
operate a first nozzle in a plurality of nozzles in the multi-nozzle extruder to emit an extrusion material onto a surface of a receiving member in the print zone to form a first swath during the movement of the multi-nozzle extruder in the first process direction;
move the multi-nozzle extruder in a second process direction along the first axis within the print zone of the three-dimensional object printer using the actuator, the second process direction being different than the first process direction;

operate the first nozzle in the plurality of nozzles to emit the extrusion material onto the surface of the receiving member in the print zone to form a second swath during the movement of the multi-nozzle extruder in the second process direction;

generate scanned image data of the first swath and the second swath using the optical scanner;

identify at least one of a first width and a first height of the first swath in the scanned image data;

identify at least one of a second width and a second height of the second swath in the scanned image data;

identify a first angular deviation component for the multi-nozzle extruder that is about a second axis that is perpendicular to the first axis using at least one of a first difference between the first width and the second width and a second difference between the first height and the second height;

identify a first direction of the first angular deviation component about the second axis in response to at least one of the first width of the first swath being greater than the second width of the second swath and the first height of the first swath being less than the second height of the second swath; and identify a second direction of the first angular deviation component about the second axis in response to at least one of the first width of the first swath being less than the second width of the second swath and the first height of the first swath being greater than the second height of the second swath.

2. The three-dimensional object printer of claim 1, the controller being further configured to:

generate the scanned image data with the optical sensor, the scanned image data including height profile data corresponding to the first swath and the second swath;

identify a first location of a first lateral edge of the first swath and a second location of a second lateral edge of the first swath;

identify the first width of the first swath with reference to a difference between the first location and the second location in a direction that is perpendicular to a length of the first swath;

identify a third location of a first lateral edge of the second swath and a fourth location of a second lateral edge of the second swath;

identify the second width of the second swath with reference to a difference between the third location and the fourth location in the direction that is perpendicular to a length of the second swath.

3. The three-dimensional object printer of claim 1 further comprising:

a memory; and the controller being operatively connected to the memory and further configured to:

identify a reflectance level of at least one pixel corresponding to the first swath in the scanned image data; and identify the first height of the first swath with reference to the reflectance level of the at least one pixel and a predetermined curve stored in the memory, the curve including a mapping of a plurality of reflectance levels to a plurality of heights of swaths of the extrusion material.

4. The three-dimensional object printer of claim 1, the controller being further configured to:

move the multi-nozzle extruder in the second process direction along the first axis at an angle of 180° from the first process direction using the actuator.

5. The three-dimensional object printer of claim 1 further comprising:

at least one angular adjustment actuator operatively connected the multi-nozzle extruder, the at least one angular adjustment actuator being configured to adjust an angle of rotation of the multi-nozzle extruder in the print zone; and the controller being operatively connected to the at least one angular adjustment actuator and further configured to:

operate the at least one actuator to reduce or eliminate the first angular deviation component of the multi-nozzle extruder.

6. The three-dimensional object printer of claim 1, the controller being further configured to:

move the multi-nozzle extruder in a third process direction along the second axis within the print zone of the three-dimensional object printer using the actuator;

operate the first nozzle in the plurality of nozzles in the multi-nozzle extruder to emit the extrusion material onto the surface of the receiving member in the print zone to form a third swath during the movement of the multi-nozzle extruder in the third process direction;

move the multi-nozzle extruder in a fourth process direction along the second axis within the print zone of the three-dimensional object printer using the actuator, the fourth process direction being different than the third process direction;

operate the first nozzle in the plurality of nozzles to emit the extrusion material onto the surface of the receiving member in the print zone to form a fourth swath during the movement of the multi-nozzle extruder in the fourth process direction;

generate the scanned image data of the third swath and the fourth swath using the optical sensor;

identify at least one of a third width and a third height of the third swath in the scanned image data;

identify at least one of a fourth width and a fourth height of the fourth swath in the scanned image data; and identify a second angular deviation component for the multi-nozzle extruder about the first axis with reference to at least one of a third difference between the third width and the fourth width and a fourth difference between the third height and the fourth height.

7. The three-dimensional object printer of claim 6 further comprising:

at least one angular adjustment actuator operatively connected the multi-nozzle extruder, the at least one angular adjustment actuator being configured to adjust an angle of rotation of the multi-nozzle extruder in the print zone; and the controller being operatively connected to the at least one angular adjustment actuator and further configured to:

operate the at least one angular adjustment actuator to reduce or eliminate the second angular deviation component.

8. The three-dimensional object printer of claim 1, the controller being further configured to:

operate a second nozzle in the plurality of nozzles in the multi-nozzle extruder to emit the extrusion material onto the surface of the receiving member in the print zone to form a third swath during the movement of the multi-nozzle extruder in the first process direction;

operate the second nozzle in the plurality of nozzles to emit the extrusion material onto the surface of the receiving member in the print zone to form a fourth swath during the movement of the multi-nozzle extruder in the second process direction;
generate the scanned image data of the first swath, the second swath, the third swath, and the fourth swath using the optical sensor;
identify at least one of a third width and a third height of the third swath in the scanned image data;
identify at least one of a fourth width and a fourth height of the fourth swath in the scanned image data; and
use at least one of a third difference between the third width and the fourth width and a fourth difference between the third height and the fourth height to identify the first angular deviation component for the multi-nozzle extruder about the second axis that is perpendicular to the first axis.

* * * * *